US012754637B2

(12) United States Patent
Chen et al.

(10) Patent No.: US 12,754,637 B2
(45) Date of Patent: Oct. 6, 2026

(54) DISPLAY DEVICE WITH BIDIRECTIONAL SYNCHRONIZATION FOR TOUCH AND ELECTROMAGNETIC SENSING, CONTROL METHOD THEREOF, AND ELECTRONIC DEVICE

(71) Applicant: HUIZHOU TCL MOBILE COMMUNICATION CO., LTD., Huizhou (CN)

(72) Inventors: Ping Chen, Huizhou (CN); Yang Yu, Huizhou (CN); Zhuwei Qiu, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 18/998,500

(22) PCT Filed: May 18, 2023

(86) PCT No.: PCT/CN2023/095151
§ 371 (c)(1),
(2) Date: Jan. 26, 2025

(87) PCT Pub. No.: WO2024/021798
PCT Pub. Date: Feb. 1, 2024

(65) Prior Publication Data

US 2026/0029874 A1 Jan. 29, 2026

(30) Foreign Application Priority Data

Jul. 28, 2022 (CN) ......................... 202210901454.0

(51) Int. Cl.
*G06F 3/041* (2006.01)
*G06F 3/046* (2006.01)

(52) U.S. Cl.
CPC ............ *G06F 3/0418* (2013.01); *G06F 3/046* (2013.01); *G06F 2203/04114* (2019.05)

(58) Field of Classification Search
CPC ................... G06F 3/0418; G06F 3/046; G06F 2203/04114
See application file for complete search history.

(56) References Cited

U.S. PATENT DOCUMENTS

2014/0002413 A1* 1/2014 Kim ...................... G06F 3/0446 345/174
2016/0004338 A1 1/2016 Hsu
2018/0032202 A1* 2/2018 Kim ........................ G06F 3/041

FOREIGN PATENT DOCUMENTS

CN 103139704 A 6/2013
CN 103513845 A 1/2014
(Continued)

OTHER PUBLICATIONS

International Search Report in International application No. PCT/CN2023/095151, mailed on Aug. 30, 2023.
(Continued)

*Primary Examiner* — Lisa S Landis
(74) *Attorney, Agent, or Firm* — PV IP PC; Wei Te Chung

(57) ABSTRACT

A display device, a display device control method, and an electronic device are provided. The display device includes a touch control circuit, a touch timing control circuit, an electromagnetic film circuit, and an electromagnetic film timing control circuit. The touch timing control circuit outputs a first timing control signal. The electromagnetic film timing control circuit outputs a second timing control signal. The touch timing control circuit also outputs a first synchronization signal to the electromagnetic film timing control circuit to synchronize a working time sequence of the touch control circuit to the electromagnetic film timing
(Continued)

control circuit; and/or the electromagnetic film timing control circuit outputs a second synchronization signal to the touch timing control circuit to synchronize a working time sequence of the electromagnetic film circuit, so that power-on timings of the first timing control signal and the second timing control signal are staggered.

20 Claims, 2 Drawing Sheets

(56) References Cited

FOREIGN PATENT DOCUMENTS

| | | | |
|---|---|---|---|
| CN | 103677470 | A | 3/2014 |
| CN | 106325600 | A | 1/2017 |
| CN | 107205085 | A | 9/2017 |
| CN | 108615352 | A | 10/2018 |
| CN | 113093619 | A | 7/2021 |
| CN | 113220163 | A | 8/2021 |
| KR | 20160070728 | A | 6/2016 |

OTHER PUBLICATIONS

Written Opinion of the International Search Authority in International application No. PCT/CN2023/095151, mailed on Aug. 30, 2023.

Chinese Office Action issued in corresponding Chinese Patent Application No. 202210901454.0 dated Apr. 17, 2026, pp. 1-7.

* cited by examiner

DISPLAY DEVICE WITH BIDIRECTIONAL SYNCHRONIZATION FOR TOUCH AND ELECTROMAGNETIC SENSING, CONTROL METHOD THEREOF, AND ELECTRONIC DEVICE

CROSS REFERENCE TO RELATED APPLICATIONS

This application is a US national phase application based upon an International Application No. PCT/CN2023/095151, filed on May 18, 2023, which claims priority to Chinese Patent Applications No. 202210901454.0, filed on Jul. 28, 2022 and entitled "DISPLAY DEVICE, DISPLAY DEVICE CONTROL METHOD, AND ELECTRONIC DEVICE". The entire disclosures of the above application are incorporated herein by reference.

TECHNICAL FIELD

The present application relates to the field of electronic technology, and in particular to a display device, a display device control method, and an electronic device.

BACKGROUND TECHNOLOGY

Electromagnetic pens are widely used in electronic devices such as mobile phones, tablets, and bank signatures. Display devices of these electronic devices combine electromagnetic induction technology and touch technology. Users can input information by handwriting with the electromagnetic pen or by touching with their fingers.

Technical Problem

However, in the related art, a display device using these two technologies has a problem of mutual interference between electromagnetic signals and touch signals, thereby affecting a sensitivity of the display device.

SUMMARY OF INVENTION

Embodiments of the present application provide a display device, a display device control method, and an electronic device, which can improve a problem of mutual interference between electromagnetic signals and touch signals in a display device and improve a sensitivity of the display device.

In a first aspect, an embodiment of the present application provides a display device, including a touch control circuit, a touch timing control circuit, an electromagnetic film circuit, and an electromagnetic film timing control circuit.

- the touch timing control circuit is configured to output a first timing control signal, the first timing control signal is configured to control a working time sequence of the touch control circuit.
- the electromagnetic film timing control circuit is configured to output a second timing control signal, the second timing control signal is configured to control a working time sequence of the electromagnetic film circuit.
- the touch timing control circuit is further configured to output a first synchronization signal to the electromagnetic film timing control circuit, the first synchronization signal is configured to synchronize the working time sequence of the touch control circuit to the electromagnetic film timing control circuit; and/or the electromagnetic film timing control circuit is further configured to output a second synchronization signal to the touch timing control circuit, the second synchronization signal is configured to synchronize the working time sequence of the electromagnetic film circuit, so that a power-on timing of the first timing control signal is staggered with a power-on timing of the second timing control signal.

Alternatively, the touch timing control circuit includes a first GPIO port, the first GPIO port is electrically connected to the electromagnetic film timing control circuit, and the first GPIO port is configured to output the first synchronization signal.

Alternatively, the electromagnetic film timing control circuit includes a second GPIO port, the second GPIO port is electrically connected to the touch timing control circuit, and the second GPIO port is configured to output the second synchronization signal.

Alternatively, a time interval between every two adjacent power-on timings of the first timing control signal is greater than a duration of the power-on timing of the second timing control signal.

Alternatively, a time interval between every two adjacent power-on timings of the second timing control signal is greater than a duration of the power-on timing of the first timing control signal.

Alternatively, the time interval between every two adjacent power-on timings of the first timing control signal includes a first starting time and a first ending time, the power-on timing of the second timing control signal is started after waiting for a first time period after the first starting time, and the first ending time is reached after a second time period has passed after the power-on timing of the second timing control signal is completed.

Alternatively, the time interval between every two adjacent power-on timings of the second timing control signal includes a second starting time and a second ending time, the power-on timing of the first timing control signal is started after waiting for a third time period after the second starting time, and the second ending time is reached after a fourth time period after the power-on timing of the first timing control signal is completed.

In a second aspect, an embodiment of the present application provides a display device control method, which is applied to a display device, where the display device includes a touch control circuit, a touch timing control circuit, an electromagnetic film circuit, and an electromagnetic film timing control circuit, and the method includes:

- controlling the touch timing control circuit to output a first timing control signal, the first timing control signal being configured to control a working time sequence of the touch control circuit.
- controlling the electromagnetic film timing control circuit to output a second timing control signal, the second timing control signal being configured to control a working time sequence of the electromagnetic film circuit.
- controlling the touch timing control circuit to output a first synchronization signal to the electromagnetic film timing control circuit, the first synchronization signal being configured to synchronize the working time sequence of the touch control circuit to the electromagnetic film timing control circuit; and/or controlling the electromagnetic film timing control circuit to output a second synchronization signal to the touch timing control circuit, the second synchronization signal being configured to synchronize the working time sequence of the electromagnetic film circuit, so that a power-on timing of the first timing control signal is staggered with a power-on timing of the second timing control signal.

Alternatively, a time interval between every two adjacent power-on timings of the first timing control signal is greater than a duration of the power-on timing of the second timing control signal.

Alternatively, a time interval between every two adjacent power-on timings of the second timing control signal is greater than a duration of the power-on timing of the first timing control signal.

Alternatively, the time interval between every two adjacent power-on timings of the first timing control signal includes a first starting time and a first ending time, the power-on timing of the second timing control signal is started after waiting for a first time period after the first starting time, and the first ending time is reached after a second time period has passed after the power-on timing of the second timing control signal is completed.

Alternatively, the time interval between every two adjacent power-on timings of the second timing control signal includes a second starting time and a second ending time, the power-on timing of the first timing control signal is started after waiting for a third time period after the second starting time, and the second ending time is reached after a fourth time period after the power-on timing of the first timing control signal is completed.

In a third aspect, an embodiment of the present application further provides an electronic device, including a display device, where the display device includes a touch control circuit, a touch timing control circuit, an electromagnetic film circuit, and an electromagnetic film timing control circuit.

the touch timing control circuit is configured to output a first timing control signal, the first timing control signal is configured to control a working time sequence of the touch control circuit.

the electromagnetic film timing control circuit is configured to output a second timing control signal, the second timing control signal is configured to control a working time sequence of the electromagnetic film circuit.

the touch timing control circuit is further configured to output a first synchronization signal to the electromagnetic film timing control circuit, the first synchronization signal is configured to synchronize the working time sequence of the touch control circuit to the electromagnetic film timing control circuit; and/or the electromagnetic film timing control circuit is further configured to output a second synchronization signal to the touch timing control circuit, the second synchronization signal is configured to synchronize the working time sequence of the electromagnetic film circuit, so that a power-on timing of the first timing control signal is staggered with a power-on timing of the second timing control signal.

Alternatively, a power-on timing of the touch control circuit and a power-on timing of the electromagnetic film circuit do not overlap.

The touch timing control circuit includes a first GPIO port, the first GPIO port is electrically connected to the electromagnetic film timing control circuit, and the first GPIO port is configured to output the first synchronization signal.

Alternatively, the electromagnetic film timing control circuit includes a second GPIO port, the second GPIO port is electrically connected to the touch timing control circuit, and the second GPIO port is configured to output the second synchronization signal.

Alternatively, a time interval between every two adjacent power-on timings of the first timing control signal is greater than a duration of the power-on timing of the second timing control signal.

Alternatively, a time interval between every two adjacent power-on timings of the second timing control signal is greater than a duration of the power-on timing of the first timing control signal.

Alternatively, the time interval between every two adjacent power-on timings of the first timing control signal includes a first starting time and a first ending time, the power-on timing of the second timing control signal is started after waiting for a first time period after the first starting time, and the first ending time is reached after a second time period has passed after the power-on timing of the second timing control signal is completed.

Alternatively, the time interval between every two adjacent power-on timings of the second timing control signal includes a second starting time and a second ending time, the power-on timing of the first timing control signal is started after waiting for a third time period after the second starting time, and the second ending time is reached after a fourth time period after the power-on timing of the first timing control signal is completed.

Beneficial Effects

In an embodiment of the present application, the touch timing control circuit is configured to output the first timing control signal. The first timing control signal is configured to control the working time sequence of the touch control circuit. The electromagnetic film timing control circuit is configured to output the second timing control signal. The second timing control signal is configured to control the working time sequence of the electromagnetic film circuit. The touch timing control circuit is also configured to output the first synchronization signal to the electromagnetic film timing control circuit. The electromagnetic film timing control circuit acquires the power-on timing and a power-off timing of the first timing control signal through the first synchronization signal, so that the electromagnetic film timing control circuit can adjust the second timing control signal in real time according to the first timing control signal, and stagger the power-on timing of the second timing control signal with the power-on timing of the first timing control signal; and/or, the electromagnetic film timing control circuit is further configured to output the second synchronization signal to the touch timing control circuit, and the touch timing control circuit acquires the power-on timing and a power-off timing of the second timing control signal through the second synchronization signal, so that the touch timing control circuit can adjust the first timing control signal in real time according to the second timing control signal, and stagger the power-on timing of the first timing control signal with the power-on timing of the second timing control signal. This makes it possible that the power-on timings of the touch control circuit and the electromagnetic film circuit do not overlap, and the touch control circuit and the electromagnetic film circuit perform touch detection and electromagnetic film detection in time-sharing. Therefore, the electromagnetic signal and the touch signal do not interfere with each other. Whether the display device is used by writing with an electromagnetic pen or touching with a finger, the sensitivity of the display device is good.

BRIEF DESCRIPTION OF THE DRAWINGS

In order to more clearly illustrate technical solutions in embodiments of the present application, the following briefly introduces accompanying drawings required for use in the description of the embodiments. Apparently, the accompanying drawings described below are only some embodiments of the present application. For those skilled in the art, other drawings can also be obtained based on these accompanying drawings without creative efforts.

DETAILED DESCRIPTION OF THE EMBODIMENTS

Figure 1:
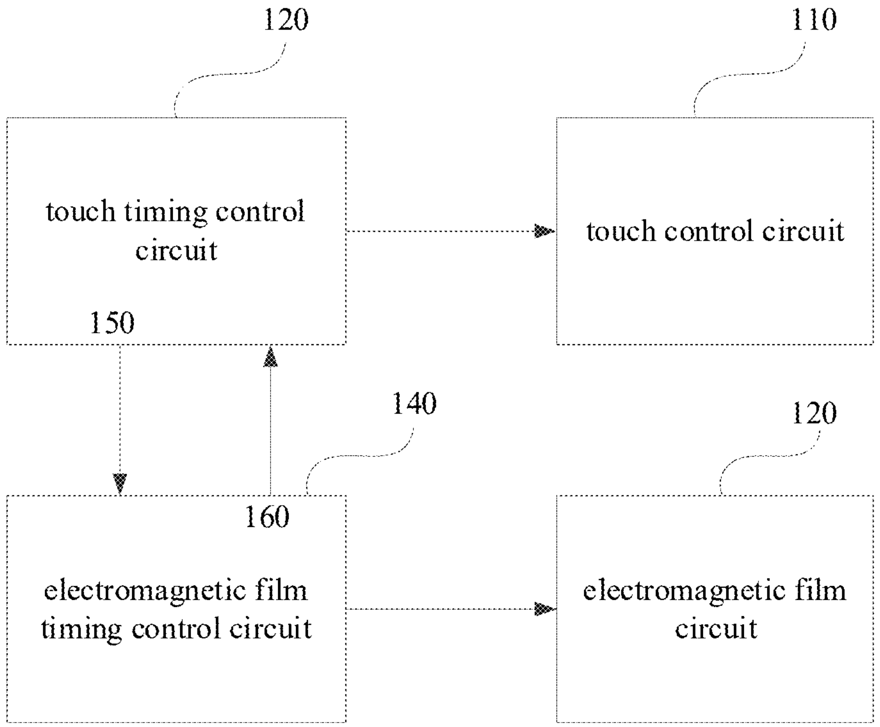
FIG. 1 is a schematic diagram of a structure of a display device provided in an embodiment of the present application.

Please refer to the drawings, where components with the same reference numeral represent the same components. The principles of the present application are illustrated by implementing them in an appropriate computing environment. The following description is based on the illustrated specific embodiments of the present application, which should not be considered as limiting other specific embodiments of the present application that are not described in detail herein.

Please refer to FIG. 1, which is a schematic diagram of a structure of a display device provided by an embodiment of the present application. The display device 100 includes a touch control circuit 110, a touch timing control circuit 120, an electromagnetic film circuit 130, and an electromagnetic film timing control circuit 140. The touch timing control circuit 120 is configured to output a first timing control signal. The first timing control signal is configured to control a working time sequence of the touch control circuit 110. The electromagnetic film timing control circuit 140 is configured to output the second timing control signal. The second timing control signal is configured to control a working time sequence of the electromagnetic film circuit 130.

The display device 100 includes the touch control circuit 110 and the electromagnetic film circuit 130. Positions of the touch control circuit 110 and the electromagnetic film circuit 130 are relatively close, so it is easy to cause mutual interference between the electromagnetic signal and the touch signal. For example, in an Incell display device 100, the touch control circuit 110 is arranged in a glass substrate, and the electromagnetic film circuit 130 is arranged in a backlight, and positions of the electromagnetic film circuit 130 and the glass substrate are close. The electromagnetic signal emitted by the electromagnetic film circuit 130 during the power-on timing will directly enter an interior of the glass substrate, and the touch control circuit 110 inside the glass substrate is easily interfered by the electromagnetic signal, thereby causing touch failure or touch ghost point problems. It should be noted that the mutual interference problem exists not only in the Incell display device 100, but also in other types of display devices 100, such as an AMOLED display device 100, an Oncell display device 100, etc.

In the embodiment of the present application, the display device 100 further includes the touch timing control circuit 120 and the electromagnetic film timing control circuit 140. The touch timing control circuit 120 is configured to output the first timing control signal, and the first timing control signal is configured to control the working time sequence of the touch control circuit 110, so that the touch control circuit 110 can periodically scan according to the first timing control signal to achieve touch detection. When the user touches the display device 100 with a finger, the touch control circuit 110 can detect the corresponding touch signal. The electromagnetic film timing control circuit 140 is configured to output the second timing control signal, and the second timing control signal is configured to control the working time sequence of the electromagnetic film circuit 130, so that the electromagnetic film circuit 130 can also periodically scan according to the second timing control signal to achieve electromagnetic detection. When the user writes on the display device 100 with an electromagnetic pen, the electromagnetic film circuit 130 can detect the corresponding electromagnetic signal.

Figure 2:
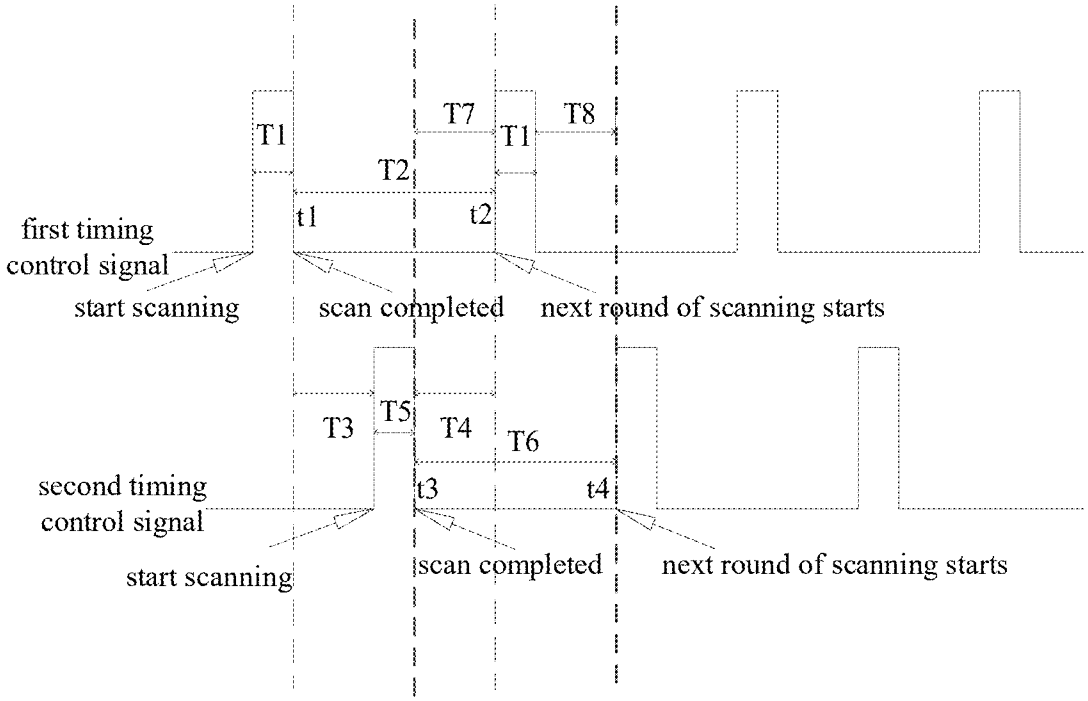
FIG. 2 is a schematic diagram of a first timing control signal and a second timing control signal provided in an embodiment of the present application.

Please refer to FIG. 2, which is a schematic diagram of a first timing control signal and a second timing control signal provided in an embodiment of the present application. The first timing control signal includes a power-on timing and a power-off timing. When the touch control circuit 110 is in the power-on timing, the touch control circuit 110 performs the touch detection. When the touch control circuit 110 is in the power-off timing, the touch control circuit 110 is in a non-working electrical state. The second timing control signal also includes a power-on timing and a power-off timing. When the electromagnetic film circuit 130 is in the power-on timing, the electromagnetic film circuit 130 performs the electromagnetic detection. When the electromagnetic film circuit 130 is in the power-off timing, the electromagnetic film circuit 130 is in a non-working state.

It is understandable that scanning frequencies of the touch control circuit 110 and the electromagnetic film circuit 130 are different. At the start of scanning, the power-on timings of the first timing control signal and the second timing control signal are staggered. However, as time changes, the power-on timings of the first timing control signal and the second timing control signal will approach and overlap, thereby causing mutual interference between the electromagnetic signal and the touch signal. As a result, when the display device 100 is used by writing with an electromagnetic pen or touching with a finger, the sensitivity of the display device 100 is poor. In addition, even if the scanning frequencies of the touch control circuit 110 and the electromagnetic film circuit 130 are set to be the same or multiples, since frequency values of both have errors in an actual circuit, the power-on timings of the first timing control signal and the second timing control signal will also approach and overlap as time changes, thereby causing mutual interference between the electromagnetic signal and the touch signal.

In the embodiment of the present application, the touch timing control circuit 120 is further configured to output the first synchronization signal to the electromagnetic film timing control circuit 140, where the first synchronization signal is configured to synchronize the working time sequence of the touch control circuit 110 to the electromagnetic film timing control circuit 140; and/or, the electromagnetic film timing control circuit 140 is further configured to output the second synchronization signal to the touch timing control circuit 120, where the second synchronization signal is configured to synchronize the working time sequence of the electromagnetic film circuit 130, so that the power-on timing of the first timing control signal is staggered with the power-on timing of the second timing control signal.

In one embodiment, the touch timing control circuit 120 outputs the first synchronization signal to the electromagnetic film timing control circuit 140. The touch timing control circuit 120 synchronizes the working time sequence of the touch control circuit 110 to the electromagnetic film timing control circuit 140 through the first synchronization signal. That is, the electromagnetic film timing control circuit 140 can acquire the power-on timing and power-off timing of the first timing control signal. Therefore, when the electromagnetic film timing control circuit 140 outputs the second timing control signal, the power-on timing of the second timing control signal can be staggered with the power-on timing of the first timing control signal, so that the electromagnetic film circuit 130 completes the electromagnetic detection within the power-off timing of the first timing control signal and is in a non-working state during the power-on timing of the first timing control signal. Therefore, the electromagnetic film timing control circuit 140 can adjust the second timing control signal in real time according to the first timing control signal, so that the power-on timing of the second timing control signal can be staggered with the power-on timing of the first timing control signal.

In another embodiment, the electromagnetic film timing control circuit 140 may output the second synchronization signal to the touch timing control circuit 120. The electromagnetic film timing control circuit 140 synchronizes the working time sequence of the electromagnetic film circuit 130 to the touch timing control circuit 120 through the second synchronization signal. That is, the touch timing control circuit 120 may acquire the power-on timing and power-off timing of the second timing control signal, so that when the touch timing control circuit 120 outputs the first timing control signal, the power-on timing of the first timing control signal may be staggered with the power-on timing of the second timing control signal, so that the touch control circuit 110 completes the touch detection within the power-off timing of the second timing control signal and is in a non-working state during the power-on timing of the second timing control signal. Therefore, the touch timing control circuit 120 may adjust the first timing control signal in real time according to the second timing control signal, so that the power-on timing of the first timing control signal may be staggered with the power-on timing of the second timing control signal.

In another embodiment, the touch timing control circuit 120 may output the first synchronization signal to the electromagnetic film timing control circuit 140, so that the electromagnetic film timing control circuit 140 acquires the power-on timing and the power-off timing of the first timing control signal. Furthermore, the electromagnetic film timing control circuit 140 may output the second synchronization signal to the touch timing control circuit 120, so that the touch timing control circuit 120 acquires the power-on timing and the power-off timing of the second timing control signal. Therefore, the touch timing control circuit 120 may adjust the first timing control signal in real time according to the second timing control signal, so that the power-on timing of the first timing control signal is staggered with the power-on timing of the second timing control signal. Furthermore, the electromagnetic film timing control circuit 140 may also adjust the second timing control signal in real time according to the first timing control signal, so that the power-on timing of the second timing control signal is staggered with the power-on timing of the first timing control signal.

In the above three embodiments, the power-on timings of the touch control circuit 110 and the electromagnetic film circuit 130 will not overlap, so that the touch control circuit 110 and the electromagnetic film circuit 130 can perform the touch detection and the electromagnetic film detection in a time-sharing manner, so that the electromagnetic signal and the touch signal will not interfere with each other. Therefore, whether the display device 100 is used by writing with an electromagnetic pen or touching with a finger, the sensitivity of the display device 100 is good.

Please continue to refer to FIG. 2, the first timing control signal is configured to control the working time sequence of the touch control circuit 110. Exemplarily, the first timing control signal can be a periodic square wave, including periodic power-on timings and power-off timings. When the square wave is at a high level, it is the power-on timing, and the touch control circuit 110 performs the touch detection at the power-on timing. When the square wave is at a low level, it is the power-off timing, and the touch control circuit 110 is in a non-working state at the power-off timing. The first synchronization signal is configured to synchronize the working time sequence of the touch control circuit 110. That is, the first synchronization signal is configured to synchronize the first timing control signal. Exemplarily, the first synchronization signal can be the same as the first timing control signal, both of which are periodic square waves. When the square wave of the first timing control signal is at a high level, the square wave of the first synchronization signal is also at a high level. When the square wave of the first timing control signal is at a low level, the square wave of the first synchronization signal is also at a low level. The electromagnetic film timing control circuit 140 receives the first synchronization signal output by the touch timing circuit. If it identifies that the first synchronization signal is at a high level at this time, the electromagnetic film timing control circuit 140 knows that the first timing control signal is also at a high level at this time, and is in the power-on timing, and the touch control circuit 110 is performing the touch detection, and then the second timing control signal is controlled to be the power-off timing, and the electromagnetic detection is not performed. If it identifies that the first synchronization signal is at a low level at this time, the electromagnetic film timing control circuit 140 knows that the first timing control signal is also at a low level at this time, and is in the power-off timing, and the touch control circuit 110 is in a non-working state, and then the second timing control signal can be controlled to be the power-on timing, and the electromagnetic detection is performed, so that the electromagnetic signal and the touch signal will not interfere with each other.

In another embodiment, the first synchronization signal may also be different from the first timing control signal. The first synchronization signal only needs to correspond to the power-on timing and the power-off timing of the first timing control signal. For example, when the first timing control signal switches from the power-off timing to the power-on timing, the first synchronization signal sends a first pulse. When the first timing control signal switches from the power-on timing to the power-off timing, the first synchronization signal sends a second pulse. The electromagnetic film timing control circuit 140 receives the first synchronization signal output by the touch timing control circuit 120. If it identifies that the first synchronization signal sends the first pulse at this time, the electromagnetic film timing control circuit 140 knows that the first timing control signal switches to the power-on timing at this time, and the touch control circuit 110 starts to perform the touch detection, then the second timing control signal is controlled to be the power-off timing, and electromagnetic detection is not performed. If it identifies that the first synchronization signal sends the second pulse at this time, the electromagnetic film timing control circuit 140 knows that the first timing control signal is switched to the power-off timing at this time, and the touch control circuit 110 starts to be in a non-working state, and then the second timing control signal can be controlled to be the power-on timing to perform electromagnetic detection, so that the electromagnetic signal and the touch signal will not interfere with each other.

The second timing control signal is configured to control the working time sequence of the electromagnetic film circuit 130. Exemplarily, the second timing control signal may also be a periodic square wave, including periodic power-on timings and power-off timings. When the square wave is at a high level, it is the power-on timing, and the electromagnetic film circuit 130 performs the touch detection at the power-on timing. When the square wave is at a low level, it is the power-off timing, and the electromagnetic film circuit 130 is in a non-working state at the power-off timing. The second synchronization signal is configured to synchronize the working time sequence of the electromagnetic film circuit 130. That is, the second synchronization signal is configured to synchronize the second timing control signal. Exemplarily, the second synchronization signal may be the same as the second timing control signal, both of which are periodic square waves. When the square wave of the second timing control signal is at a high level, the square wave of the second synchronization signal is also at a high level. When the square wave of the second timing control signal is at a low level, the square wave of the second synchronization signal is also at a low level. The touch timing control circuit 120 receives the second synchronization signal output by the electromagnetic film timing circuit. If the second synchronization signal is at a high level at this time, the touch timing control circuit 120 knows that the second timing control signal is also at a high level at this time, and is in the power-on timing, and the electromagnetic film circuit 130 is performing the electromagnetic detection, and then the first timing control signal is controlled to be the power-off timing, and no touch detection is performed, so that the touch signal does not interfere with the electromagnetic signal. If the second synchronization signal is at a low level at this time, the touch timing control circuit 120 knows that the second timing control signal is also at a low level at this time, and is in the power-off timing, and the electromagnetic film circuit 130 is in a non-working state, and then the first timing circuit signal can be controlled to be the power-on timing, and the touch detection is performed, so that the electromagnetic signal and the touch signal do not interfere with each other. The first pulse may be different from the second pulse.

In another embodiment, the second synchronization signal may be different from the second timing control signal. The second synchronization signal only needs to correspond to the power-on timing and the power-off timing of the second timing control signal. For example, when the second timing control signal switches from the power-off timing to the power-on timing, the second synchronization signal sends a third pulse. When the second timing control signal switches from the power-on timing to the power-off timing, the second synchronization signal sends a fourth pulse. The touch timing control circuit 120 receives the second synchronization signal output by the electromagnetic film timing circuit. If the second synchronization signal sends the third pulse at this time, the touch timing control circuit 120 knows that the second timing control signal switches to the power-on timing at this time, and the electromagnetic film circuit 130 starts to perform the touch detection, then the first timing control signal is controlled to be the power-off timing, and the touch detection is not performed. If the second synchronization signal sends the fourth pulse at this time, the touch timing control circuit 120 knows that the second timing control signal is switched to the power-off timing, and the electromagnetic film circuit 130 starts to be in a non-working state. Then, the first timing control signal can be controlled to be the power-on on timing to perform the touch detection, so that the electromagnetic signal and the touch signal will not interfere with each other.

In one embodiment, the touch timing control circuit 120 includes a first GPIO port 150. The first GPIO port 150 is electrically connected to the electromagnetic film timing control circuit 140. The first GPIO port 150 is configured to output the first synchronization signal. That is, when the display device 100 is working, the touch timing control circuit 120 can output the first synchronization signal to the electromagnetic film timing control circuit 140 through the first GPIO port 150, so that the electromagnetic film timing control circuit 140 acquires the working time sequence of the touch control circuit 110 according to the first synchronization signal.

In another embodiment, the electromagnetic film timing control circuit 140 includes a second GPIO port 160. The second GPIO port 160 is electrically connected to the touch timing control circuit 120. The second GPIO port 160 is configured to output the second synchronization signal. That is, when the display device 100 is working, the electromagnetic film timing control circuit 140 can output the second synchronization signal to the touch timing control circuit 120 through the second GPIO port 160, so that the touch timing control circuit 120 acquires the working time sequence of the electromagnetic film circuit 130 according to the second synchronization signal.

In one embodiment, a time interval between each two adjacent power-on timings of the first timing control signal is greater than a duration of the power-on timing of the second timing control signal. The first timing control signal may be a periodic square wave. There is a power-off timing between each two adjacent power-on timings of the first timing control signal. When the first timing control signal is in the power-off timing, the touch control circuit 110 is in a non-working state. At this time, the second timing control signal may be in the power-on timing, and the electromagnetic film circuit 130 may perform the electromagnetic detection. Also, when the first timing control signal switches from the power-off timing to the power-on timing, the power-on timing of the second timing control signal has ended. That is, within the time period of the power-off timing of the first timing control signal, the second timing control signal completes the electromagnetic detection process from the start of power-on to the end of power-on.

It should be noted that scanning frequencies of the touch control circuit 110 and the electromagnetic film circuit 130 are different. For example, the scanning frequency of the electromagnetic film circuit 130 may be greater than the scanning frequency of the touch control circuit 110. Therefore, within the time interval between every two adjacent power-on timings of the first timing control signal, the second timing control signal may include one or more power-on timings. That is, the electromagnetic film circuit 130 may complete one or more electromagnetic detections within the time period of the power-off timing of the first timing control signal. As long as the first timing control signal switches from the power-off timing to the power-on timing, the one or more power-on timings in the first timing control signal are completed. In addition, the first timing control signal and the second timing control signal may be set as needed. Not every power-off timing of the first timing control signal will be subjected to the electromagnetic detection by the second timing control signal.

Exemplarily, at each the power-on start timing and the power-on end timing of the first timing control signal, the touch timing control circuit 120 outputs the first synchronization signal to the electromagnetic film timing control circuit 140. If the electromagnetic film timing control circuit 140 identifies that the first timing control signal is in the power-on timing at this time, the second timing control signal is controlled to be the power-off timing. If the first timing control signal is identified as the power-off timing at this time, the second timing control signal can be controlled to be the power-on timing. Moreover, when the electromagnetic film timing control circuit 140 identifies that the current first timing control signal is in the power-off timing, the power-on start time of the next round of scanning of the first timing control signal can be calculated according to the first synchronization signal, and the second timing control signal is adjusted accordingly to ensure that the power-on timing of the second timing control signal is completed before the power-on start time of the next round of the first timing control signal. For example, part of the power-on timings of the second timing control signal is cancelled or delayed.

In another embodiment, a time interval between each two adjacent power-on timings of the second timing control signal is greater than a duration of the power-on timing of the first timing control signal. The second timing control signal may be a periodic square wave. There is a power-off timing between each two adjacent power-on timings of the second timing control signal. When the second timing control signal is in the power-off timing, the electromagnetic film circuit 130 is in a non-working state, at which time the first timing control signal may be in the power-on timing, and the touch control circuit 110 may perform the touch detection. Also, when the second timing control signal switches from the power-off timing to the power-on timing, the power-on timing in the first timing control signal has ended. That is, within the time period of the power-off timing of the second timing control signal, the first timing control signal completes the touch detection process from the start of power-on to the end of power-on.

It should be noted that scanning frequencies of the touch control circuit 110 and the electromagnetic film circuit 130 are different. Therefore, in the time interval between every two adjacent power-on timings of the first timing control signal, the second timing control signal may include one or more power-on timings. In addition, waveforms of the first timing control signal and the second timing control signal may be set as required. The first timing control signal does not perform the touch detection during every power-off timing of the second timing control signal.

Exemplarily, at each the power-on start timing and the power-on end timing of the second timing control signal, the electromagnetic film timing control circuit 140 outputs the second synchronization signal to the touch timing control circuit 120. If the touch timing control circuit 120 identifies that the second timing control signal is in the power-on timing at this time, the first timing control signal is controlled to be the power-off timing. If the second timing control signal is identified as the power-off timing at this time, the first timing control signal can be controlled to be the power-on timing. Moreover, when the touch timing control circuit 120 identifies that the current second timing control signal is in the power-off timing, the next round of the power-on start time of the second timing control signal can be calculated according to the second synchronization signal, and the first timing control circuit is adjusted accordingly to ensure that the power-on timing of the first timing control signal is completed before the next round of the power-on start time of the second timing control signal. For example, part of the power-on timings of the first timing control signal is cancelled or delayed.

Exemplarily, at each of the power-on start timing and the power-on end timing of the first timing control signal, the touch timing control circuit 120 outputs the first synchronization signal to the electromagnetic film timing control circuit 140. Moreover, at each of the power-on start timing and the power-on end timing of the second timing control signal, the electromagnetic film timing control circuit 140 also outputs the second synchronization signal to the touch timing control circuit 120. Therefore, if the electromagnetic film timing control circuit 140 identifies that the first timing control signal is in the power-on timing at this time, the second timing control signal is controlled to be the power-off timing. If the first timing control signal is identified as the power-off timing at this time, the second timing control signal can be controlled to be the power-on timing. If the touch timing control circuit 120 identifies that the second timing control signal is in the power-on timing at this time, the first timing control signal is controlled to be the power-off timing. If it is identified that the second timing control signal is the power-off timing at this time, the first timing control signal can be controlled to be the power-on timing, thereby ensuring that the electromagnetic signal and the touch signal do not interfere with each other.

In one embodiment, the time interval between every two adjacent power-on timings of the first timing control signal includes a first starting time and a first ending time, the power-on timing of the second timing control signal starts after waiting for a first time period after the first starting time, and the first ending time is reached after a second time period has passed after the power-on timing of the second timing control signal is completed.

In another embodiment, the time interval between every two adjacent power-on timings of the second timing control signal includes a second starting time and a second ending time, and the power-on timing of the first timing control signal is started after waiting for a third time period after the second starting time, and the second ending time is reached after a fourth time period has passed after the power-on timing of the first timing control signal is completed.

Please continue to refer to FIG. 2. In the figure, the power-on timing of the second timing control signal is completed within the time period of the power-off timing of the first timing control signal. Moreover, within the time period of the power-off timing of the second timing control signal, the power-on timing of the first timing control signal is completed. The first timing control signal and the second timing control signal are both periodic square waves. Each cycle includes one power-on timing and one power-off timing. The time period of the power-on timing of the first timing control signal is T1, and the time period of the power-off timing is T2. The power-off timing includes a first starting time t1 and a first ending time t2. After the first starting time t1, the power-on timing of the second timing control signal starts after waiting for a first time period T3. Moreover, after the power-on timing of the second timing control signal is completed, the first ending time t2 is reached after a second time period T4. The time period of the power-on timing of the second timing control signal is T5, and the time period of the power-off timing is T6. The power-off timing includes a second starting time t3 and a second ending time t4. After the second starting time t3, the power-on timing of the first timing control signal starts after waiting for a third time period T7. Moreover, after the power-on timing of the first timing control signal is completed, the second ending time t4 is reached after a fourth time period T8. The time period T2 of the power-off timing of the first timing control signal may be the sum of the first time period T3, the time period T5 of the power-on timing of the second timing control signal, and the second time period T4. The first time period T3 and the second time period T4 need to be greater than 0 us, so as to prevent the power-on start timing or the power-on end timing of the electromagnetic film circuit 130 from overlapping with the power-off start timing or the power-on start timing of the touch control circuit 110, causing the electromagnetic signal to interfere with the touch signal. The time period T6 of the power-off timing of the second timing control signal can be the sum of the third time period T7, the time period T1 of the power-on timing of the first timing control signal, and the fourth time period T8. The third time period T7 and the fourth time period T8 need to be greater than 0 us, so as to prevent the power-on start timing or the power-on end timing of the touch control circuit 110 from overlapping with the power-off start timing or the power-on start timing of the electromagnetic film circuit 130, causing the touch signal to interfere with the electromagnetic signal.

Figure 3:
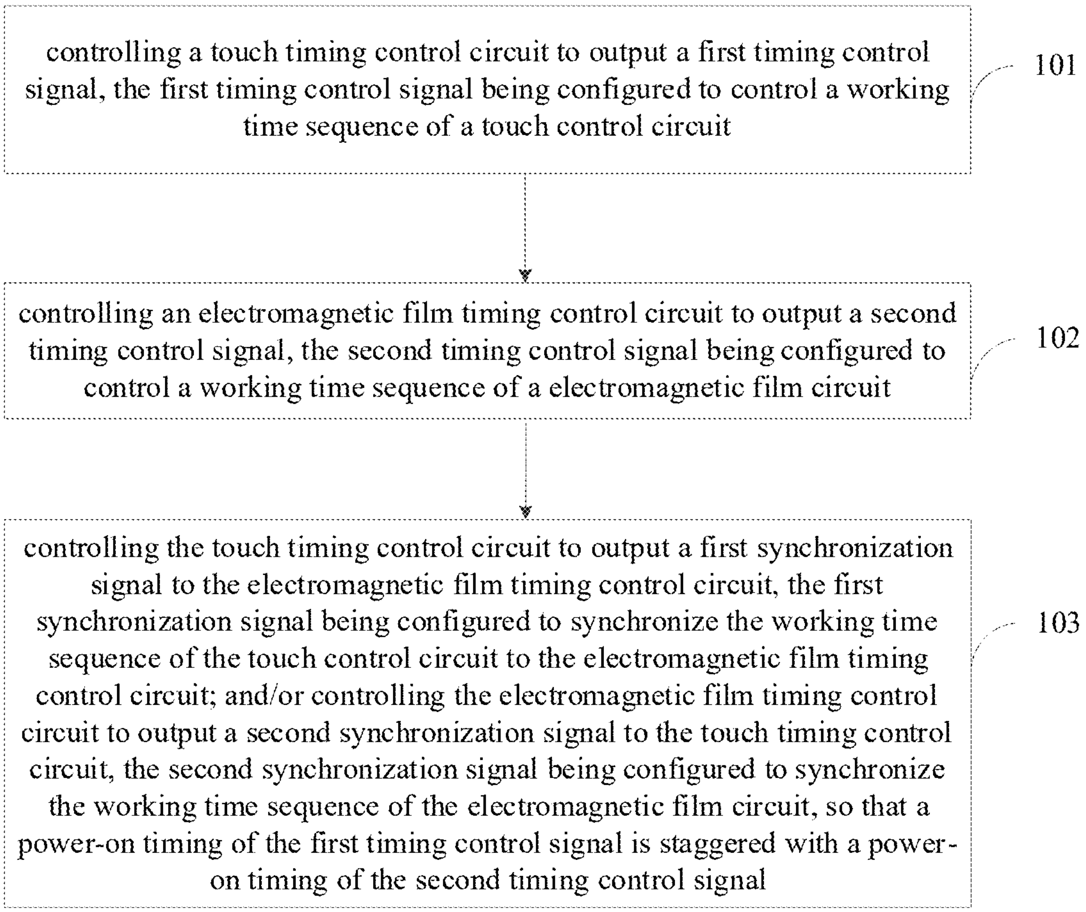
FIG. 3 is a flowchart of a display device control method provided in an embodiment of the present application.

Please refer to FIG. 3, which is a flowchart of a display device control method provided in an embodiment of the present application. The embodiment of the present application also provides a display device control method, which is applied to a display device, where the display device includes a touch control circuit, a touch timing control circuit, an electromagnetic film circuit, and an electromagnetic film timing control circuit, and the method includes:

In 101, the touch timing control circuit is controlled to output a first timing control signal, and the first timing control signal is configured to control a working time sequence of the touch control circuit.

The touch timing control circuit is controlled to output the first timing control signal. The first timing control signal is configured to control the working time sequence of the touch control circuit, so that the touch control circuit can periodically scan according to the first timing control signal to implement the touch detection. When the user touches the display device with a finger, the touch control circuit can detect the corresponding touch signal.

In 102, the electromagnetic film timing control circuit is controlled to output a second timing control signal, and the second timing control signal is configured to control a working time sequence of the electromagnetic film circuit.

The electromagnetic film timing control circuit is controlled to output the second timing control signal. The second timing control signal is configured to control the working time sequence of the electromagnetic film circuit, so that the electromagnetic film circuit can also periodically scan according to the second timing control signal to achieve the electromagnetic detection. When the user uses an electromagnetic pen to write on the display device, the electromagnetic film circuit can detect the corresponding electromagnetic signal.

In 103, the touch timing control circuit is controlled to output a first synchronization signal to the electromagnetic film timing control circuit, where the first synchronization signal is configured to synchronize the working time sequence of the touch control circuit to the electromagnetic film timing control circuit; and/or, the electromagnetic film timing control circuit is controlled to output a second synchronization signal to the touch timing control circuit, where the second synchronization signal is configured to synchronize the working time sequence of the electromagnetic film circuit, so that a power-on timing of the first timing control signal is staggered with a power-on timing of the second timing control signal.

Exemplarily, the first timing control signal and the second synchronization signal may both be periodic square waves, including periodic power-on timings and power-off timings. When the square wave is at a high level, it is the power-on timing, and when the square wave is at a low level, it is the power-off timing. The first synchronization signal is configured to synchronize the first timing control signal, and the second synchronization signal is configured to synchronize the second timing control signal.

In one embodiment, the touch timing control circuit is controlled to output the first synchronization signal to the electromagnetic film timing control circuit. The touch timing control circuit synchronizes the working time sequence of the touch control circuit to the electromagnetic film timing control circuit through the first synchronization signal. That is, the electromagnetic film timing control circuit can acquire the power-on timing and the power-off timing of the first timing control signal, so that when the electromagnetic film timing control circuit outputs the second timing control signal, the power-on timing of the second timing control signal can be staggered with the power-on timing of the first timing control signal, so that the electromagnetic film circuit completes the electromagnetic detection within the power-off timing of the first timing control signal and is in a non-working state at the power-on timing of the first timing control signal. For example, at each of the power-on start timing and the power-on end timing of the first timing control signal, the touch timing control circuit outputs the first synchronization signal to the electromagnetic film timing control circuit. If the electromagnetic film timing control circuit identifies that the first timing control signal is in the power-on timing at this time, the second timing control signal is controlled to be the power-off timing. If the first timing control signal is identified as the power-off timing at this time, the second timing control signal can be controlled to be the power-on timing. Moreover, when the electromagnetic film timing control circuit identifies that the current first timing control signal is in the power-off timing, the power-on start time of the next round of scanning of the first timing control signal can be calculated according to the first synchronization signal, and the second timing control signal is adjusted accordingly. This ensures that the power-on timing of the second timing control signal is completed before the power-on start time of the next round of the first timing control signal. For example, part of the power-on timings of the second timing control signal can be delayed or cancelled.

In another embodiment, the electromagnetic film timing control circuit may be controlled to output the second synchronization signal to the touch timing control circuit. The electromagnetic film timing control circuit synchronizes the working time sequence of the electromagnetic film circuit to the touch timing control circuit through the second synchronization signal. That is, the touch timing control circuit may acquire the power-on timing and the power-off timing of the second timing control signal, so that when the touch timing control circuit outputs the first timing control signal, the power-on timing of the first timing control signal may be staggered with the power-on timing of the second timing control signal. This allows the touch control circuit to complete the touch detection within the power-off timing of the second timing control signal and be in a non-working state during the power-on timing of the second timing control signal. For example, at each power-on start timing and the power-on end timing of the second timing control signal, the electromagnetic film timing control circuit outputs the second synchronization signal to the touch timing control circuit. If the touch timing control circuit identifies that the second timing control signal is in the power-on timing at this time, it controls the first timing control signal to be in the power-off timing. If the touch timing control circuit identifies that the second timing control signal is in the power-off timing at this time, it can control the first timing control signal to be in the power-on timing. Moreover, when the touch timing control circuit identifies that the current second timing control signal is in the power-off timing, it can also calculate the next round of the power-on start time of the second timing control signal according to the second synchronization signal, and adjust the first timing control circuit accordingly. This ensures that the power-on timing of the first timing control signal is completed before the next round of the power-on start time of the second timing control signal. For example, part of the power-on timings of the first timing control signal can be delayed or cancelled.

In another embodiment, the touch timing control circuit may output the first synchronization signal to the electromagnetic film timing control circuit, so that the electromagnetic film timing control circuit acquires the power-on timing and the power-off timing of the first timing control signal. Furthermore, the electromagnetic film timing control circuit may output the second synchronization signal to the touch timing control circuit, so that the touch timing control circuit acquires the power-on timing and the power-off timing of the second timing control signal. Therefore, the touch timing control circuit can adjust the first timing control signal according to the second timing control signal in real time, so that the power-on timing of the first timing control signal is staggered with the power-on timing of the second timing control signal. Moreover, the electromagnetic film timing control circuit can also adjust the second timing control signal according to the first timing control signal in real time, so that the power-on timing of the second timing control signal is staggered with the power-on timing of the first timing control signal. For example, at each of the power-on start timing and the power-on end timing of the first timing control signal, the touch timing control circuit will output the first synchronization signal to the electromagnetic film timing control circuit. Moreover, at each of the power-on start timing and the power-on end timing of the second timing control signal, the electromagnetic film timing control circuit will also output the second synchronization signal to the touch timing control circuit. Therefore, if the electromagnetic film timing control circuit identifies that the first timing control signal is in the power-on timing at this time, the second timing control signal will be controlled to be the power-off timing. If the first timing control signal is identified as the power-off timing at this time, the second timing control signal can be controlled to be the power-on timing. If the touch timing control circuit identifies that the second timing control signal is in the power-on timing at this time, the first timing control signal will be controlled to be the power-off timing. If the second timing control signal is identified as the power-off timing at this time, the first timing control signal can be controlled to be the power-on timing, thereby ensuring that the electromagnetic signal and the touch signal do not interfere with each other.

In the above three embodiments, the power-on timings of the touch control circuit and the electromagnetic film circuit will not overlap, so that the touch control circuit and the electromagnetic film circuit can perform the touch detection and the electromagnetic film detection in a time-sharing manner, so that the electromagnetic signal and the touch signal will not interfere with each other. Therefore, whether the display device is used by writing with an electromagnetic pen or touching with a finger, the sensitivity of the display device is good.

In one embodiment, a time interval between each two adjacent power-on timings of the first timing control signal is greater than a duration of the power-on timing of the second timing control signal. In another example, a time interval between each two adjacent power-on timings of the second timing control signal is greater than a duration of the power-on timing of the first timing control signal.

In one embodiment, the time interval between every two adjacent power-on timings of the first timing control signal includes a first starting time and a first ending time. After the first starting time, the power-on timing of the second timing control signal is started after waiting for a first time period, and the first ending time is reached after the power-on timing of the second timing control signal is completed after a second time period. In another example, the time interval between every two adjacent power-on timings of the second timing control signal includes a second starting time and a second ending time. After the second starting time, the power-on timing of the first timing control signal is started after waiting for a third time period, and the second ending time is reached after the power-on timing of the first timing control signal is completed after a fourth time period.

For example, please continue to refer to FIG. 2. In the figure, the power-on timing of the second timing control signal is completed within the time period of the power-off timing of the first timing control signal. Moreover, within the time period of the power-off timing of the second timing control signal, the power-on timing of the first timing control signal is completed. The time period of the power-on timing of the first timing control signal is T1, and the time period of the power-off timing is T2. The power-off timing includes a first starting time t1 and a first ending time t2. After the first starting time t1, the power-on timing of the second timing control signal starts after waiting for a first time period T3. Moreover, after the power-on timing of the second timing control signal is completed, the first ending time t2 is reached after a second time period T4. The time period of the power-on timing of the second timing control signal is T5, and the time period of the power-off timing is T6. The power-off timing includes a second starting time t3 and a second ending time t4. After the second starting time t3, the power-on timing of the first timing control signal starts after waiting for a third time period T7. Moreover, after the power-on timing of the first timing control signal is completed, the second ending time t4 is reached after a fourth time period T8. The time period T2 of the power-off timing of the first timing control signal may be the sum of the first time period T3, the time period T5 of the power-on timing of the second timing control signal, and the second time period T4. The first time period T3 and the second time period T4 need to be greater than 0 us, thereby preventing the power-on start timing or the power-on end timing of the electromagnetic film circuit 130 from overlapping with the power-off start timing or the power-on start timing of the touch control circuit 110, causing the electromagnetic signal to interfere with the touch signal. The power-off timing time period T6 of the second timing control signal can be the sum of the third time period T7, the power-on timing time period T1 of the first timing control signal, and the fourth time period T8. The third time period T7 and the fourth time period T need to be greater than 0 us, thereby preventing the power-on start timing or the power-on end timing of the touch control circuit from overlapping with the power-off start timing or the power-on start timing of the electromagnetic film circuit, causing the problem of the touch signal interfering with the electromagnetic signal.

The embodiment of the present application also provides an electronic device, and the electronic device of the embodiment of the present application includes but is not limited to mobile phones, tablets, bank signature electronic devices or other portable electronic devices. The electronic device includes the display device in any of the above embodiments, which will not be repeated again.

In the above embodiments, the description of each embodiment has its own emphasis. For the part that is not described in detail in a certain embodiment, please refer to the detailed description of the display device above, and will not be repeated here.

The display device, the display device control method, and the electronic device provided by the embodiments of the present application are described in detail above. Specific examples are used herein to illustrate the principles and implementation methods of the present application. The description of the above embodiments is only configured to help understand the method and core idea of the present application. At the same time, for those skilled in the art, according to the idea of the present application, there will be changes in the specific implementation method and application scope. In summary, the content of this specification should not be understood as limiting the present application.

What is claimed is:

1. A display device, comprising a touch control circuit, a touch timing control circuit, an electromagnetic film circuit, and an electromagnetic film timing control circuit;

wherein the touch timing control circuit is configured to output a first timing control signal, the first timing control signal is configured to control a working time sequence of the touch control circuit;

the electromagnetic film timing control circuit is configured to output a second timing control signal, the second timing control signal is configured to control a working time sequence of the electromagnetic film circuit;

the touch timing control circuit is further configured to output a first synchronization signal to the electromagnetic film timing control circuit, the first synchronization signal is configured to synchronize the working time sequence of the touch control circuit to the electromagnetic film timing control circuit; and the electromagnetic film timing control circuit is further configured to output a second synchronization signal to the touch timing control circuit, the second synchronization signal is configured to synchronize the working time sequence of the electromagnetic film circuit, so that a power-on timing of the first timing control signal is staggered with a power-on timing of the second timing control signal;

wherein the first synchronization signal is configured to indicate a power-on timing and a power-off timing of the first timing control signal, or is configured to indicate a transition between the power-on timing and the power-off timing of the first timing control signal; and the second synchronization signal is configured to indicate a power-on timing and a power-off timing of the second timing control signal, or is configured to indicate a transition between the power-on timing and the power-off timing of the second timing control signal.

2. The display device according to claim 1, wherein the touch timing control circuit comprises a first General-Purpose Input/Output (GPIO) port, the first GPIO port is electrically connected to the electromagnetic film timing control circuit, and the first GPIO port is configured to output the first synchronization signal.

3. The display device according to claim 1, wherein the electromagnetic film timing control circuit comprises a second GPIO port, the second GPIO port is electrically connected to the touch timing control circuit, and the second GPIO port is configured to output the second synchronization signal.

4. The display device according to claim 1, wherein a time interval between every two adjacent power-on timings of the first timing control signal is greater than a duration of the power-on timing of the second timing control signal.

5. The display device according to claim 1, wherein a time interval between every two adjacent power-on timings of the second timing control signal is greater than a duration of the power-on timing of the first timing control signal.

6. The display device according to claim 4, wherein the time interval between every two adjacent power-on timings of the first timing control signal comprises a first starting time and a first ending time, the power-on timing of the second timing control signal is started after waiting for a first time period after the first starting time, and the first ending time is reached after a second time period has passed after the power-on timing of the second timing control signal is completed.

7. The display device according to claim 5, wherein the time interval between every two adjacent power-on timings of the second timing control signal comprises a second starting time and a second ending time, the power-on timing of the first timing control signal is started after waiting for a third time period after the second starting time, and the second ending time is reached after a fourth time period after the power-on timing of the first timing control signal is completed.

8. A display device control method, applied to a display device, wherein the display device comprises a touch control circuit, a touch timing control circuit, an electromagnetic film circuit, and an electromagnetic film timing control circuit, and the method comprises:

controlling the touch timing control circuit to output a first timing control signal, the first timing control signal being configured to control a working time sequence of the touch control circuit;

controlling the electromagnetic film timing control circuit to output a second timing control signal, the second timing control signal being configured to control a working time sequence of the electromagnetic film circuit;

controlling the touch timing control circuit to output a first synchronization signal to the electromagnetic film timing control circuit, the first synchronization signal being configured to synchronize the working time sequence of the touch control circuit to the electromagnetic film timing control circuit; and controlling the electromagnetic film timing control circuit to output a second synchronization signal to the touch timing control circuit, the second synchronization signal being configured to synchronize the working time sequence of the electromagnetic film circuit, so that a power-on timing of the first timing control signal is staggered with a power-on timing of the second timing control signal;

wherein the first synchronization signal is configured to indicate a power-on timing and a power-off timing of the first timing control signal, or is configured to indicate a transition between the power-on timing and the power-off timing of the first timing control signal; and the second synchronization signal is configured to indicate a power-on timing and a power-off timing of the second timing control signal, or is configured to indicate a transition between the power-on timing and the power-off timing of the second timing control signal.

9. The display device control method according to claim 8, wherein a time interval between every two adjacent power-on timings of the first timing control signal is greater than a duration of the power-on timing of the second timing control signal.

10. The display device control method according to claim 8, wherein a time interval between every two adjacent power-on timings of the second timing control signal is greater than a duration of the power-on timing of the first timing control signal.

11. The display device control method according to claim 9, wherein the time interval between every two adjacent power-on timings of the first timing control signal comprises a first starting time and a first ending time, the power-on timing of the second timing control signal is started after waiting for a first time period after the first starting time, and the first ending time is reached after a second time period has passed after the power-on timing of the second timing control signal is completed.

12. The display device control method according to claim 10, wherein the time interval between every two adjacent power-on timings of the second timing control signal comprises a second starting time and a second ending time, the power-on timing of the first timing control signal is started after waiting for a third time period after the second starting time, and the second ending time is reached after a fourth time period after the power-on timing of the first timing control signal is completed.

13. An electronic device, comprising a display device, wherein the display device comprises a touch control circuit, a touch timing control circuit, an electromagnetic film circuit, and an electromagnetic film timing control circuit;

the touch timing control circuit is configured to output a first timing control signal, the first timing control signal is configured to control a working time sequence of the touch control circuit;

the electromagnetic film timing control circuit is configured to output a second timing control signal, the second timing control signal is configured to control a working time sequence of the electromagnetic film circuit;

the touch timing control circuit is further configured to output a first synchronization signal to the electromagnetic film timing control circuit, the first synchronization signal is configured to synchronize the working time sequence of the touch control circuit to the electromagnetic film timing control circuit; and the electromagnetic film timing control circuit is further configured to output a second synchronization signal to the touch timing control circuit, the second synchronization signal is configured to synchronize the working time sequence of the electromagnetic film circuit, so that a power-on timing of the first timing control signal is staggered with a power-on timing of the second timing control signal;

wherein the first synchronization signal is configured to indicate a power-on timing and a power-off timing of the first timing control signal, or is configured to indicate a transition between the power-on timing and the power-off timing of the first timing control signal; and the second synchronization signal is configured to indicate a power-on timing and a power-off timing of the second timing control signal, or is configured to indicate a transition between the power-on timing and the power-off timing of the second timing control signal.

14. The electronic device according to claim 13, wherein a power-on timing of the touch control circuit and a power-on timing of the electromagnetic film circuit do not overlap.

15. The electronic device according to claim 14, wherein the touch timing control circuit comprises a first General-Purpose Input/Output (GPIO) port, the first GPIO port is electrically connected to the electromagnetic film timing control circuit, and the first GPIO port is configured to output the first synchronization signal.

16. The electronic device according to claim 13, wherein the electromagnetic film timing control circuit comprises a second GPIO port, the second GPIO port is electrically connected to the touch timing control circuit, and the second GPIO port is configured to output the second synchronization signal.

17. The electronic device according to claim 13, wherein a time interval between every two adjacent power-on timings of the first timing control signal is greater than a duration of the power-on timing of the second timing control signal.

18. The electronic device according to claim 13, wherein a time interval between every two adjacent power-on timings of the second timing control signal is greater than a duration of the power-on timing of the first timing control signal.

19. The electronic device according to claim 17, wherein the time interval between every two adjacent power-on timings of the first timing control signal comprises a first starting time and a first ending time, the power-on timing of the second timing control signal is started after waiting for a first time period after the first starting time, and the first ending time is reached after a second time period has passed after the power-on timing of the second timing control signal is completed.

20. The electronic device according to claim 18, wherein the time interval between every two adjacent power-on timings of the second timing control signal comprises a second starting time and a second ending time, the power-on timing of the first timing control signal is started after waiting for a third time period after the second starting time, and the second ending time is reached after a fourth time period after the power-on timing of the first timing control signal is completed.

* * * * *